United States Patent
Huang

(10) Patent No.: US 7,201,356 B2
(45) Date of Patent: Apr. 10, 2007

(54) MOUNTING APPARATUS OF DISPLAYER SUITABLE FOR EXTERNAL INSTALLATION AND INSET INSTALLATION

(76) Inventor: Kai-Cheng Huang, 4F., No.7, Alley 2, Lane 39, Sec.2, Zhongxiao E.Rd., Zhongzheng District, Taipei City (TW)

( * ) Notice: Subject to any disclaimer, the term of this patent is extended or adjusted under 35 U.S.C. 154(b) by 256 days.

(21) Appl. No.: 10/840,327

(22) Filed: May 7, 2004

(65) Prior Publication Data

US 2005/0247839 A1    Nov. 10, 2005

(51) Int. Cl.
*A47F 5/00* (2006.01)
*A47C 7/62* (2006.01)

(52) U.S. Cl. ............... 248/309.1; 248/27.3; 248/291.1; 248/923; 297/217.3; 361/681

(58) Field of Classification Search .............. 248/917, 248/291.1, 27.3, 309.1, 922, 923; 297/217.3; 361/681
See application file for complete search history.

(56) References Cited

U.S. PATENT DOCUMENTS

| | | | | |
|---|---|---|---|---|
| 3,795,422 A | * | 3/1974 | Robinson et al. ........... 297/146 |
| 4,756,528 A | * | 7/1988 | Umashankar ................. 463/1 |
| 5,267,775 A | * | 12/1993 | Nguyen .................... 297/217.3 |
| 5,507,556 A | * | 4/1996 | Dixon ..................... 297/217.3 |
| 5,713,633 A | * | 2/1998 | Lu .............................. 297/364 |
| 6,199,810 B1 | * | 3/2001 | Wu et al. ................. 248/291.1 |
| 6,310,767 B1 | * | 10/2001 | Spear et al. ................. 361/681 |
| 6,394,551 B1 | * | 5/2002 | Beukema ..................... 297/391 |
| 6,406,334 B2 | * | 6/2002 | Chu ........................... 439/668 |
| 6,669,285 B1 | * | 12/2003 | Park et al. ................ 297/217.3 |
| 6,698,832 B2 | * | 3/2004 | Boudinot ................. 297/217.4 |
| 2003/0025367 A1 | * | 2/2003 | Boudinot ................. 297/217.3 |

* cited by examiner

*Primary Examiner*—Anita M. King
(74) *Attorney, Agent, or Firm*—Birch, Stewart, Kolasch & Birch, LLP

(57) ABSTRACT

The invention discloses a mounting apparatus of displayer suitable for external installation and inset installation by applying a modularized design with two aspects of installation method. One of the methods is that a displayer frame is fastened on a supporting rack by means of a joint portion located at the backside of displayer frame to form a displayer frame for an external displayer. On the other hand, the modularized displayer frame is also applicable to a mounting apparatus of displayer for inset installation. This method is first to provide a pair of removable fastening sheets at two sides of displayer frame so as to form an assembling area at the outer wall of two sides of displayer frame. Then, a pair of positioning members will be joined together through two sides of a base so that a connecting portion with flexibility provided as a protrusion can be formed at the inner wall of each of two sides of base. Finally, the assembling area of displayer frame can be joined to the connecting portion at the inner wall of base and thus form the mounting apparatus of displayer for inset installation.

8 Claims, 6 Drawing Sheets

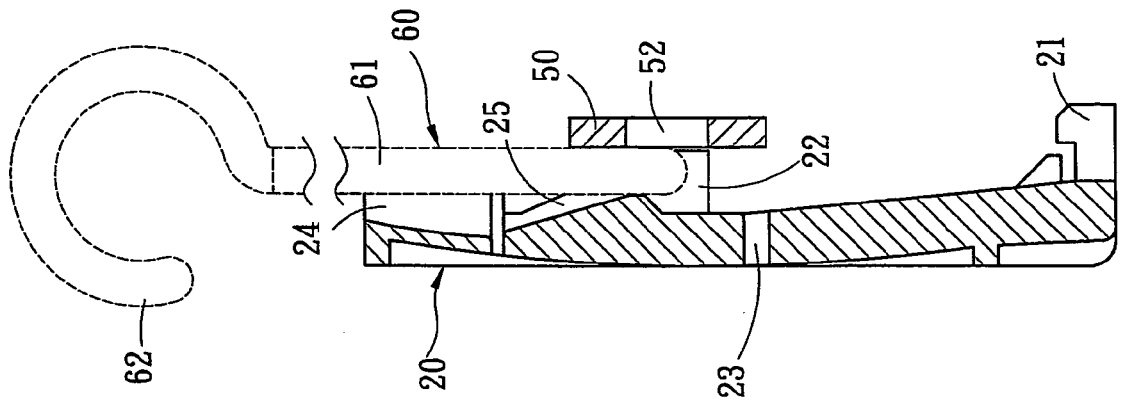
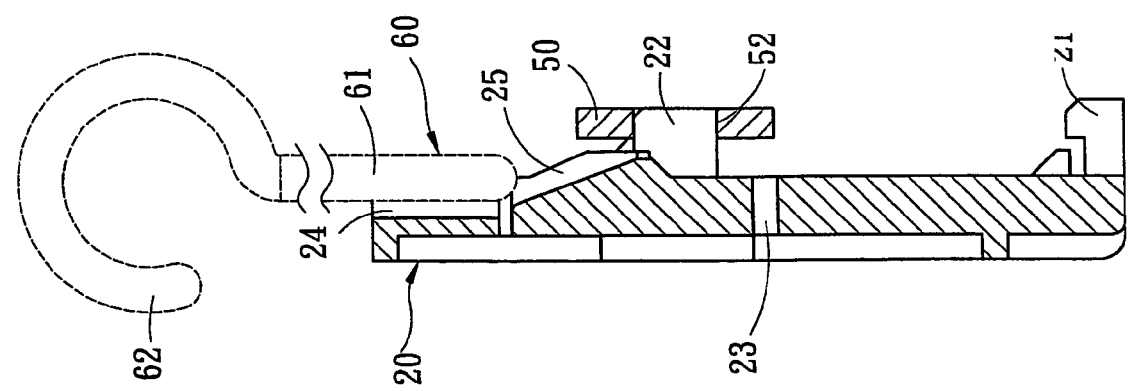

MOUNTING APPARATUS OF DISPLAYER SUITABLE FOR EXTERNAL INSTALLATION AND INSET INSTALLATION

FIELD OF THE INVENTION

The invention relates to a mounting apparatus of displayer suitable for both external installation and inset installation and, more particularly, to a mounting apparatus with modularization design suitable for two aspects of installation as well as easy for installation, dismounting, and maintenance.

BACKGROUND OF THE INVENTION

For years information technology has been supporting continuous advancements made by electronic industry. Therefore, it is possible for multimedia video industry to pursue their product goals such as better miniaturization technique and better portability in either research and development field or manufacturing field. As a result, it can be very convenient for a passenger when he/she is sitting in an airplane or automobile to view a multimedia LCD screen installed on the backside of headrest of a seat. As for the price of displayer, it has been largely decreased since the product manufacturers are very competitive in introducing new products with better miniaturization techniques. For this reason, it is now very common to see a displayer installed in an automobile because most people can afford it. If a displayer is installed for viewing from the front seat, the displayer can be installed on the panel of car or inset inside the panel for a pullout when needed. On the other hand, if a displayer is installed for viewing from the backseat, the displayer is usually installed on the backside of headrest of front seat. In addition, the displayer can further be installed beneath the roof panel for a flap-open view when needed.

A conventional displayer is installed on the backside of headrest. The installation method is to provide a recess at the backside of headrest and then inset a displayer in. But the drawback of this method is that viewing angle of the displayer cannot be adjusted. Therefore, a U.S. Patent Publication No. 5507556 entitled "Seat Including an Automatically Adjustable Display Screen Assembly" is disclosed for improving the drawback. This prior invention discloses a displayer screen assembly that can be viewed from automatically adjustable viewing angles. The display screen assembly is mounted on the seatback of a seat, wherein a recess is provided thereon and a frame is used for fastening the display screen assembly. Besides, a pivot bolt is used for fastening the display screen assembly to the frame as well as allowing pivoting movement of display screen assembly relative to the seatback. Also, the frame is further connected to a mechanism of seatback movement by a control rod. Therefore, the viewing angles of display screen assembly can be automatically adjusted in accordance with the upright or reclined position of the seat.

However, automobile crash testing has proved that traditional fastening method for a displayer is pretty dangerous because the displayer might be detached from the seatback when a car accident occurs, and the detached displayer might hit passengers sitting in the backseat, causing injuries to the passengers. Therefore, in consideration of safe ride for passengers, the dismounting job on a mounting apparatus of displayer is intentionally designed to be difficult so as to ensure installation safety in an automobile.

Moreover, although the prior art allows viewing angles of a displayer to be automatically adjustable according to upright or reclined position of backseat, the manufacturing cost and maintenance cost of displayer will have to be increased because the displayer is complicated-designed to comply with the mechanism of seatback movement.

In conclusion, drawbacks of a conventional mounting apparatus can be listed as below:

(1) The possible location for installing a conventional displayer in an automobile is at the panel of front seat, the headrest of backseat, or the roof panel. Unfortunately, there is no such mounting apparatus that can be universally applied to displayers installed in different locations; in other words, different mounting apparatuses have to be designed in accordance with different locations of displayer. To illustrate, if a displayer is to be inset inside a headrest for inset installation, a protruded axle or concaved point must be provided at two sides of the frame of mounting apparatus so that the protruded axle or concaved point can be corresponding to relative concaved hole or protruded axle located at the base of mounting apparatus for positioning. Therefore, the displayer can be firmly mounted and viewed from adjustable angles. On the other hand, if a displayer is to be externally installed on the panel, the positioning method is to allow the backside of the frame to be joined to a supporting rack for positioning. From the above description, it proves that the mounting method for inset installation is different from that of external installation. Therefore, it is necessary to design two different modules for manufacturing the mounting apparatus. For this reason, cost of production will become very high.

(2) As mentioned above, there must be a protruded axle or a concaved point provided at two sides of the displayer frame to position an inset-in displayer. If, another mounting structure is directly provided at the backside of frame for external installation, the protruded axle or concaved point at two sides of frame will then be located at the outer side of frame, which will spoil aesthetic value of the displayer.

(3) To ensure more stable positioning effect, the degree of difficulty for dismounting the mounting apparatus of displayer has to be increased. Therefore, a maintenance worker who does the dismounting job will have to pay more effort and strength during the dismounting process. The improper strength, however, might cause the protruded axle for positioning to break off or cause damage to it.

SUMMARY OF THE INVENTION

The primary and first object of the invention is to provide a mounting apparatus of displayer by means of modularized design so that the mounting apparatus can have two different aspects of installation to increase cost effectiveness in manufacturing.

According to the technical proposal of the invention, a displayer frame is fastened on a supporting rack through the joint portion at backside of displayer frame to form one aspect of external installation for the displayer; on the other hand, the modularized displayer frame can also be suitable for an inset-in mounting apparatus of displayer to form another aspect of installation, which involves providing a pair of fastening sheets detachable from the display frame at two sides of the display frame; by doing so, an assembling area is formed at the outer wall of two sides of displayer frame; then, a pair of positioning members are joined together through two sides of a base; next, a connecting portion with flexibility is provided as a protrusion at the inner walls of two sides of base; finally, the assembling area of displayer frame will join to the connecting portion at the inner walls of base, thereby forming an inset-in mounting apparatus of displayer.

The second object of the invention is that there is no additional design added to the outer surface of displayer frame as positioning support; therefore, with an intact external look, the mounting apparatus can be used for external installation without spoiling its appearance.

The third object of the invention is that the mounting apparatus is designed for easy maintaining and dismounting, which means a maintenance worker can rapidly dismount the displayer from the base by using a tool for dismounting without damaging the whole mounting apparatus; therefore, efficiency and effectiveness of maintenance worker's performance can be improved.

The fourth object of the invention is that because the material of fastening sheet added to two sides of displayer frame is metal, the stability of mounting apparatus can be increased due to this feature, and therefore the user's security can be more ensured.

The objects and technical contents of the invention will be better understood through the description of the following embodiments with reference to the drawings.

BRIEF DESCRIPTION OF THE DRAWINGS

FIGS. 5A and 5B are diagrams of operation illustrating that the connecting portion of the invention is detached from the assembling area by operating a tool for dismounting.

DETAILED DESCRIPTION OF THE PREFERRED EMBODIMENTS

Figure 1:
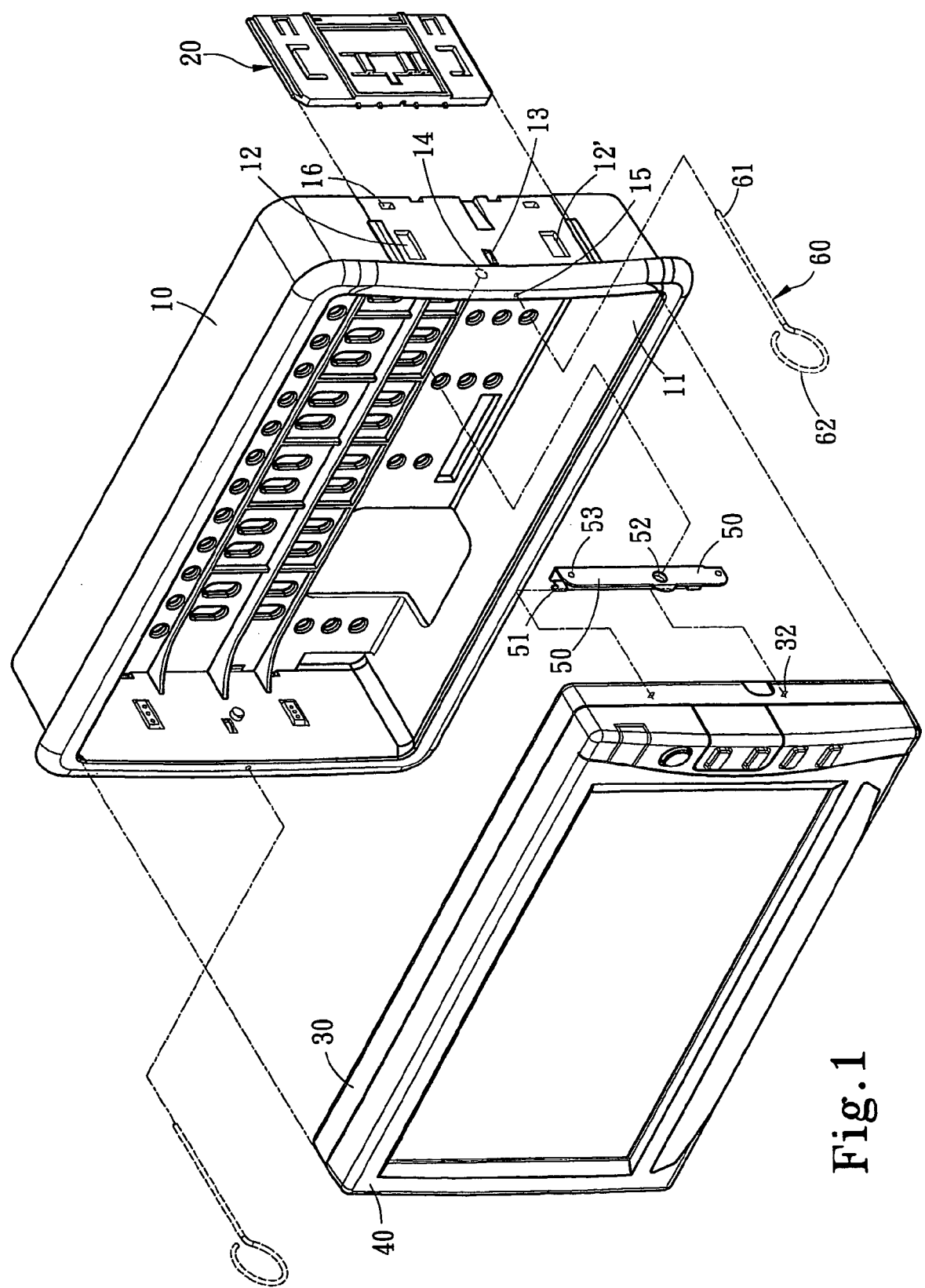
FIG. 1 is a three-dimensional exploded diagram illustrating that the invention is applied to the mounting apparatus of displayer for inset installation.
Figure 2:
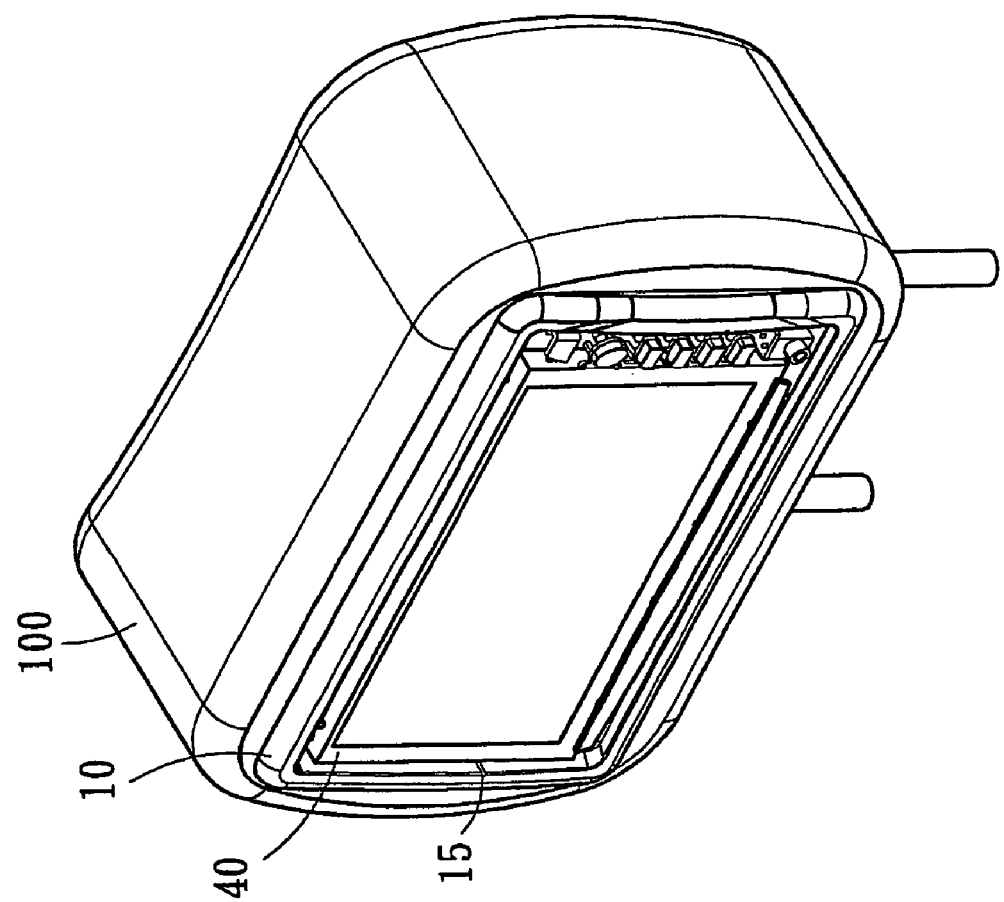
FIG. 2 is a three-dimensional external view illustrating that the invention is applied to the mounting apparatus of displayer.
Figure 3:
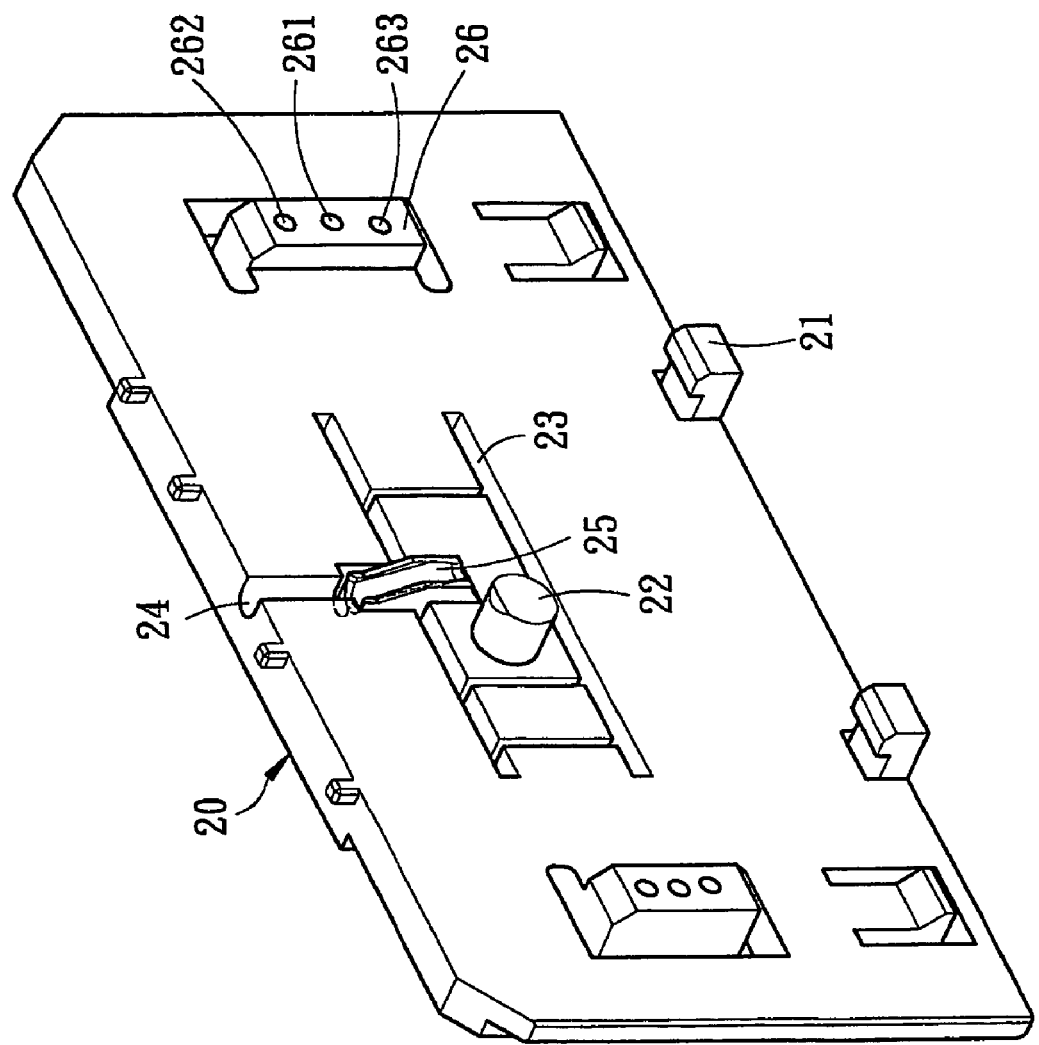
FIG. 3 is a perspective view of the positioning member of the invention.

Referring to FIGS. 1, 2, and 3, the invention provides a mounting apparatus of displayer suitable for both external installation and inset installation. By means of a displayer frame 30 that can be pivotally positioned inside a base 10 including a lateral surrounding wall having inner and outer surfaces, a displayer for inset installation is obtained; on the other hand, the displayer frame 30 can also be removed, and a displayer for external installation is formed.

Figure 6:
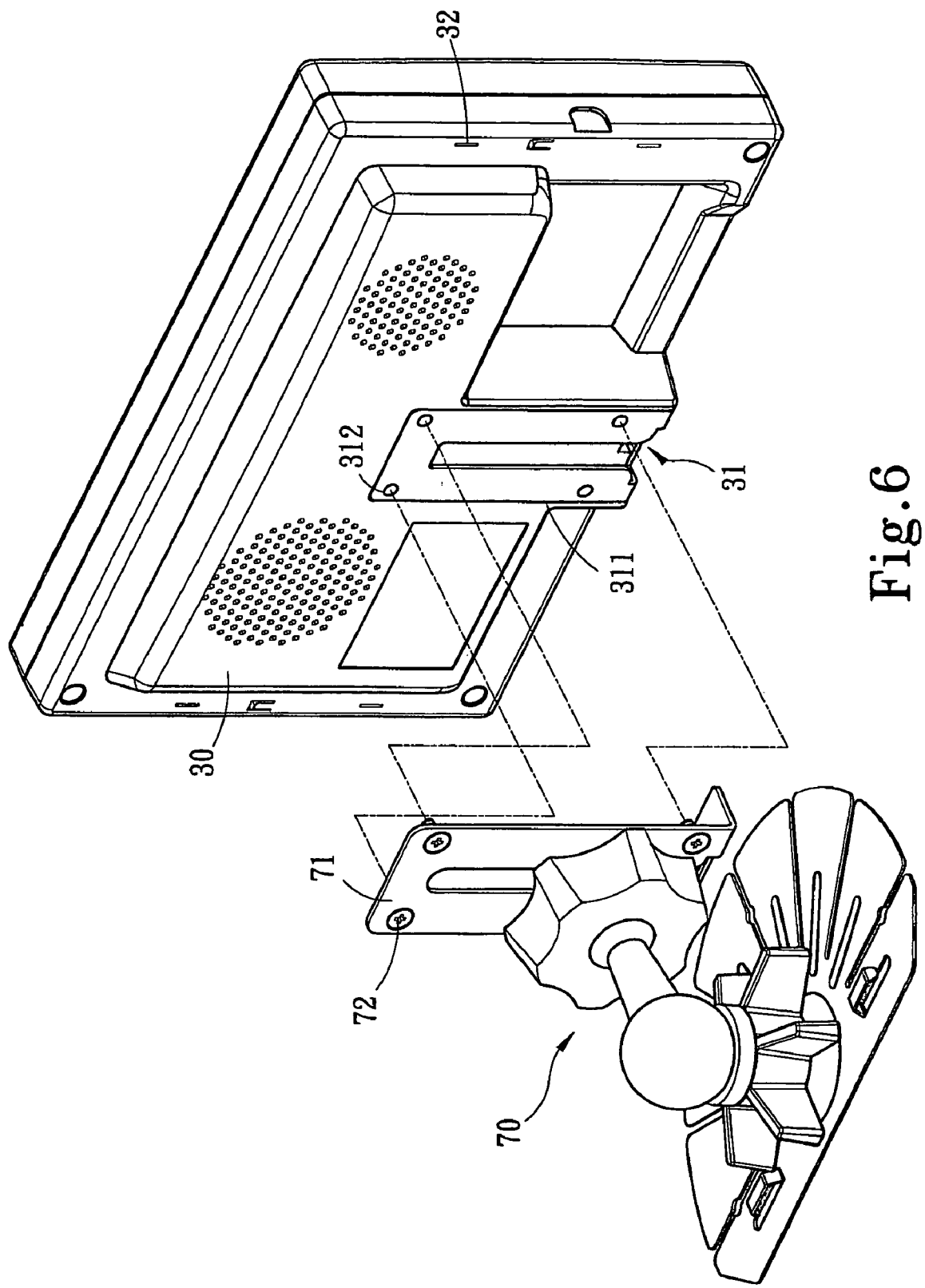
FIG. 6 is a three-dimensional exploded diagram showing that the invention is applied to the mounting apparatus of displayer for external installation.

First of all, the mounting apparatus of displayer for inset installation will be described in detail, which includes the following components:

a headrest 100, used as a part of seat in an automobile, wherein a recess (not shown) is provided in the middle of headrest 100 for accommodating a base 10 inset therein;

an accommodating space 11 defined by the inner surface, provided in the base 10 for positioning the displayer frame 30 when it is inset inside the base 10, wherein two through-slots 12 and 12' are symmetrically provided at the sidewall of base 10, and a releasing slot 13 and a through-hole 14 are located between two through-slots 12 and 12'; besides, a vent-hole 15 is provided on the base 10 on the later surrounding wall and connected to the releasing slot 13; a plurality of lodging-slots 16 is provided on the outer wall of base 10;

a pair of positioning members 20 provided symmetrically, which can be firmly positioned on the outer wall of base 10 through a plurality of tenons 21 provided on the positioning members 20; besides, a connecting portion 22 is provided in the middle of positioning member 20, opposite to the through-hole 14 on the base 10, and is connected to the inner wall of the accommodating space 11 so that the connecting portion 22 can be protruded at the inner wall of accommodating space 11 of base 10; also, because a slit 23 is provided along the edge of connecting portion 22, the connecting portion 22 is flexible with resilience; in addition, a path/groove 24 is provided at one end of connecting portion 22, and a sloping plane 25 with a shape of half cone is provided at the joint between path 24 and connecting portion 22; therefore, when external force is applied to the sloping plane 25, the connecting portion 22 can also receive the force and generate a position shift flexibly; finally, a curbing block 26 is provided as a protrusion at each of the two sides of connecting portion 22, and three adjacent concaved points 261, 262, and 263 are located on the curbing block 26; also, two curbing blocks 26 are corresponding to the through-slots 12 and 12' of base 10 so that the through-slots 12 and 12' can be penetrated by the curbing block 26 to form an inner wall of base 10;

a displayer frame 30, and its one side joins to the displayer 40 whereas the other side is provided with a joint portion 31 (as shown in FIG. 6), wherein the joint portion 31 includes a concaved slot 311 and a plurality of screw-holes 312; besides, a strip-slot 32 is provided at each of the two sides of displayer frame 30;

a pair of fastening sheets 50 provided symmetrically, and a hook 51 is provided thereon to be fastened to the strip-slot 32 at two sides of displayer frame 30 for positioning; besides, an assembling area 52 is located on the fastening sheet 50, and when installing the displayer frame 30 inside the base 10, two connecting portions 22 protruding from the inner wall of base 10 will be lodged into two assembling areas 52 of fastening sheets 52; additionally, a lodging point 53 is provided on each end of assembling area 52, and when joining the positioning members 20 to the base 10, the lodging points 53 are corresponding to the concaved points 261, 262, and 263 at the inner wall of base 10; therefore, angle-adjustment for positioning can be made between lodging points 53 and concaved points 261, 262, and 263, and thus the mounting apparatus of the invention can be completed.

Moreover, in the mounting apparatus of the invention, the displayer frame 30 is detachable from the base 10. By applying a dismounting tool 60, uninstalling operation between displayer frame 30 and base 10 can be done. The dismounting tool 60 is composed of an insertion pole 61, provided at one end of dismounting tool 60, and a round-shaped handle 62, provided at the other end of dismounting tool 60.

Figure 4B:
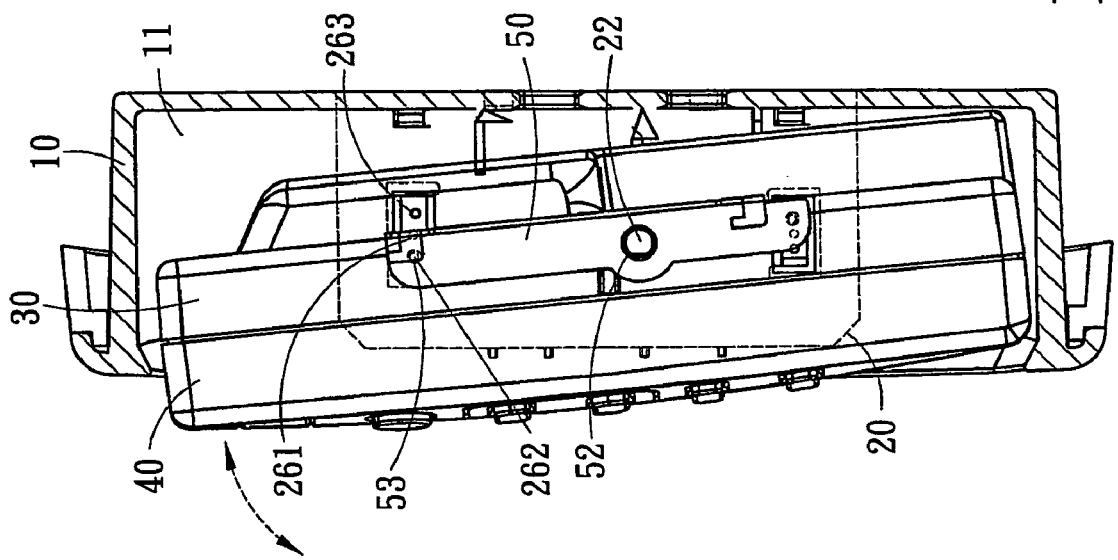
FIGS. 4A and 4B are diagrams of operation illustrating that the invention is in operation of limited angle fine-tuning.
Figure 4A:
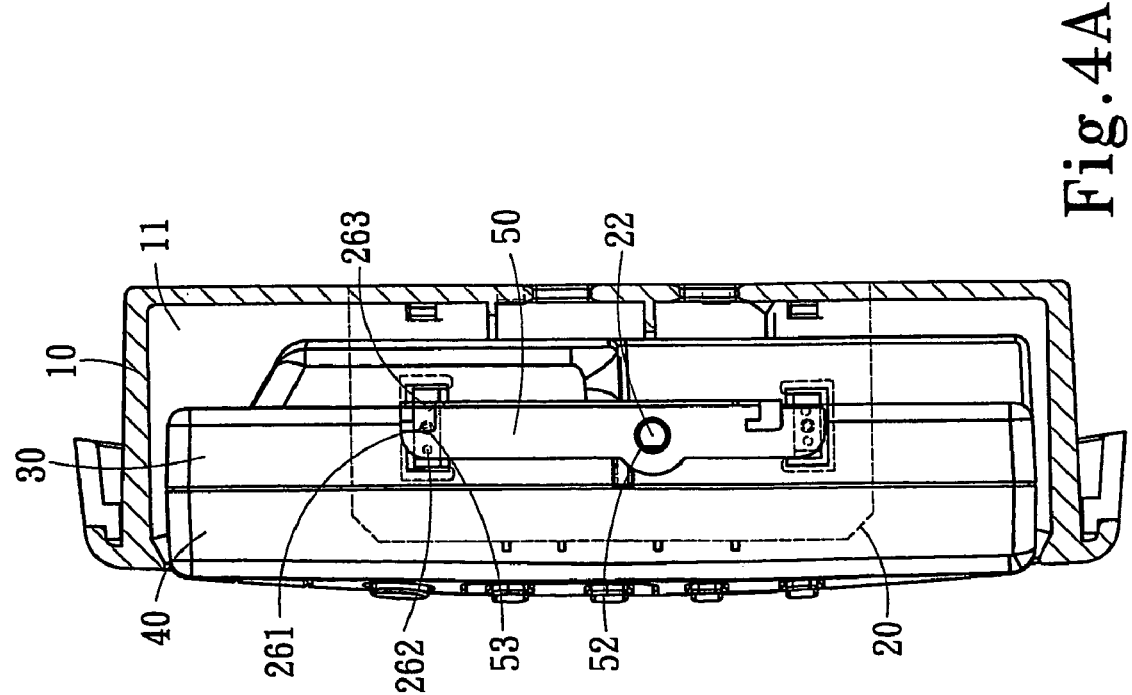

When the displayer frame 30 is put into the accommodating space 11 of base 10 for joining inside the base 10 through interlocking positioning between assembling area 52 and connecting portion 22, a fine-tuning design for small-angle pivoting between displayer frame 30 and base 10 can be formed. With reference to FIGS. 4A and 4B, the displayer frame 30 will be joined to the base 10 by allowing the lodging points 53 on fastening sheets 50 located at two sides of displayer frame 30 to be lodged into the positioning member 20 for joining. Then, the displayer frame 30 can be in a vertical manner when a joining between protruding concaved point 261 at the inner wall of base 10 and lodging point 53 is done, as shown in FIG. 4A.

If the displayer 40 cannot be clearly viewed by a viewer due to light reflection on the screen, then an angle adjustment can be made on the displayer frame 30 because the connecting portion 22 can be used as a pivot, and a pivotal turning can be generated between displayer frame 30 and base 10. However, pivotal turning is limited to small angle adjustment only. When a pivotal turning is made, the lodging point 53 will be lodged into the concaved point 262. On the other hand, if a pivotal turning is made in a direction opposite to its former one, the lodging point 53 will be lodged into another concaved point 263. By doing so, the displayer 40 can perform its limited angle fine-tuning.

When a maintenance worker intends to remove the inset mounting apparatus of displayer for maintaining, the job can be easily done by dismounting the displayer frame 30. As shown in FIGS. 5A and 5B, the dismounting method is that the worker's fingers have to hook on the handle 62 located at one end of dismounting tool 60, allowing the insertion pole 61 located at the other end of dismounting tool 60 to be inserted into the vent-hole 15 of base 10, wherein the vent-hole is connected to the path 24 of positioning member 20. Next, as the worker pushes the insertion pole 61 deeper inside, it will reach against the sloping plane 25. When the sloping plane 25 receives the force and shifts outwardly a little bit, the connecting portion 22 will be influenced by the force as well and moves outwardly. This motion, however, will cause the connecting portion 22 to be detached from the assembling area 52 of fastening sheet 50. Under this circumstance, the interlocked positioning between displayer frame 30 and base 10 will be dismissed, and the displayer frame 30 can then be dismounted from the base 10.

Next, the mounting apparatus of displayer for external installation will be illustrated. The displayer frame 30 disclosed in the invention has a particular feature; that is, the mounting apparatus is adaptable to both inset installation and external installation by applying only one single modularization. In other words, a manufacturer needs only one module for production, and this can reduce production cost effectively.

Also, as shown in FIG. 6, no protruded axle or concaved hole for positioning is needed here to be added to the outer surface of displayer frame 30; therefore, with its intact external look, the displayer can be installed by external installation without affecting its appearance. In this case, the maintenance worker can only install the displayer frame 30 as an external displayer. The method of installation is to join the joint portion 31 of displayer frame 30 to the body set 70, which means that the concaved slot 311 of joint portion 31 will be used for corresponding to the supporting rack 71 of body set 70, and then the supporting rack 71 will be screwed into the screw-hole 312 on the joint portion 31 by using screw 72. Thus, an externally installed displayer is finished, and the displayer frame 30 of the invention needs only one single module for different aspects of installation.

The embodiment above is only intended to illustrate the invention; it does not, however, to limit the invention to the specific embodiment. Accordingly, various modifications and changes may be made without departing from the spirit and scope of the invention as described in the following claims.

What is claimed is:

1. A mounting apparatus of displayer suitable for external installation and inset installation, comprising:
   a base including:
      a lateral surrounding wall including an inner surface and an outer surface, the inner surface defining an accommodation space therein, and
      a vent-hole on the lateral surrounding wall
   a displayer frame pivotally installed inside the accommodating space of the base, whereas a joint portion is provided at a backside of the displayer frame;
   a pair of positioning members connected to two opposite sides of the outer surface, each of the pair of positioning members including:
      a connecting portion protruding therefrom and entering through the lateral surrounding wall into the accommodating space,
      a groove facing the vent-hole, and
      a sloping plane; and
   a pair of fastening sheets provided symmetrically, and both joined at two opposite sides of the displayer frame and in contact with the inner surface, wherein an assembling area is formed on each of the fastening sheets for lodging the connecting portion of the corresponding positioning member, the vent-hole being insertable by a dismounting tool through the groove for pushing the sloping plane so as to detach the connecting portion from the assembling area.

2. The mounting apparatus of displayer suitable for external installation and inset installation of claim 1, wherein the joint portion of displayer frame can be installed on a supporting rack that supports the displayer frame.

3. The mounting apparatus of displayer suitable for external installation and inset installation of claim 1, wherein the connecting portion is a protruded end whereas the assembling area is a hole.

4. The mounting apparatus of displayer suitable for external installation and inset installation of claim 1, wherein the connecting portion is a hole whereas the assembling area is a protruded end.

5. The mounting apparatus of displayer suitable for external installation and inset installation of claim 1, wherein a through-hole is provided on the base, and the connecting portion penetrates the through-hole.

6. The mounting apparatus of displayer suitable for external installation and inset installation of claim 1, wherein a slit is provided along the edge of the connecting portion.

7. The mounting apparatus of displayer suitable for external installation and inset installation of claim 1, wherein a plurality of through-slots are provided at two sides of the lateral surrounding wall of the base, wherein a releasing slot and the through-hole are located between the through-slots, wherein a curbing block is provided on each of the positioning members and includes a plurality of concaved points, wherein a lodging point is provided on each of the pair of fastening sheets, and wherein an angle fine-tuning for positioning can be made through the joining between the lodging points and the concaved points.

8. The mounting apparatus of displayer suitable for external installation and inset installation of claim 7, wherein an angle pivoting can be generated between the displayer frame and the base by using the connecting portion as a pivot, and the angle fine-tuning made between the lodging points and the concaved points is guided by a contacting wall between the displayer frame and the base.

* * * * *